United States Patent
Banks

(10) Patent No.: US 10,507,790 B1
(45) Date of Patent: Dec. 17, 2019

(54) SYSTEM AND METHOD TO DETECT USAGE OF SEAT BELT

(71) Applicant: Earnest L. Banks, Glendale, TX (US)

(72) Inventor: Earnest L. Banks, Glendale, TX (US)

( * ) Notice: Subject to any disclaimer, the term of this patent is extended or adjusted under 35 U.S.C. 154(b) by 0 days.

(21) Appl. No.: 16/026,842

(22) Filed: Jul. 3, 2018

(51) Int. Cl.
*B60R 22/48* (2006.01)

(52) U.S. Cl.
CPC ...... *B60R 22/48* (2013.01); *B60R 2022/4816* (2013.01); *B60R 2022/4866* (2013.01); *B60R 2022/4891* (2013.01)

(58) Field of Classification Search
CPC ........ B60N 2/002; B60R 99/00; G08B 21/22; G08B 21/24
USPC .......................... 340/457, 425, 5, 457.1, 667
See application file for complete search history.

(56) References Cited

U.S. PATENT DOCUMENTS

| | | | |
|---|---|---|---|
| 6,104,293 A | 8/2000 | Rossi | |
| 6,489,889 B1 | 12/2002 | Smith | |
| 7,005,976 B2* | 2/2006 | Hagenbuch | B60R 22/48 180/268 |
| 7,880,601 B2* | 2/2011 | Okezie | B60R 22/48 340/3.1 |
| 8,427,294 B2* | 4/2013 | Cheung | A44B 11/2569 340/457.1 |
| 9,260,054 B1* | 2/2016 | McHomes | B60Q 1/50 |
| 9,676,356 B2* | 6/2017 | Ghannam | B60R 22/48 |
| 9,688,246 B2* | 6/2017 | Kleve | G08B 25/016 |
| 9,845,050 B1* | 12/2017 | Garza | G08B 21/0205 |
| 2013/0194089 A1* | 8/2013 | Estrada | G08B 21/22 340/457.1 |
| 2013/0214919 A1* | 8/2013 | Bassali | B60R 22/48 340/457.1 |
| 2017/0120813 A1* | 5/2017 | Wilson | B60Q 9/00 |

* cited by examiner

*Primary Examiner* — Eric Blount

(57) ABSTRACT

A system for detecting usage of a seat belt and initiating a notification signal on detecting non-usage of the seat belt. Further, the system transmits the detected data to a plurality of computing units over a communication network. The system is integrated with the seat belt of a vehicle, wherein the seat belt comprises a female unit and male unit. The system comprises a first sensor unit, circuitry unit, second sensor unit, communication unit, and power unit. The first sensor unit and the circuitry unit are integrated with the female unit to detect an unbuckled position of the seat belt. The second sensor unit is integrated with the male unit to detect a buckled position of the seat belt on completing a circuitry when the male unit is secured into the female unit of the seat belt. The circuitry unit is electrically coupled to the first sensor unit to transmit a plurality of notification signals to computing units. The communication unit transmits the notification signals such as text messages to the computing units. The power unit energizes the first sensor unit, the second sensor unit, the circuitry unit, and the communication unit.

14 Claims, 5 Drawing Sheets

SYSTEM AND METHOD TO DETECT USAGE OF SEAT BELT

BACKGROUND OF THE INVENTION

1. Field of the Invention

The present invention generally relates to a system for detecting usage of a seat belt, and particularly to a system for initiating a notification signal on detecting non-usage of the seat belt and transmits the detected data to a plurality of computing units over a communication network.

2. Description of the Related Art

Typically, the vehicles have a seat belt sensor to detect the buckle being buckled or unbuckled. The sensing of the buckled or unbuckled position is performed after the ignition is started. An indicator is used to remind the driver to fasten the seat belt. Generally, vehicles have only a driver seat belt sensor while the remaining seats do not have a seat belt sensor.

Applicant believes that a related reference corresponds to U.S. Pat. No. 6,489,889 A filed by CRAIG SMITH for an occupant sensing system for detecting the presence of an occupant within an automotive vehicle includes a seat belt sensor for detecting a buckled condition of the seat belt. The CRAIG SMITH reference discloses a system that activates an indicator when the seat belt is buckled, and the ignition is turned off. The system includes a controller that controls the indicator in response to the seat belt buckled signal and the ignition-off signal. Various types of indicators are described including remote keyless devices as well as cellular networks. Another related application is U.S. Pat. No. 6,104,293 A filed by MARC A. ROSSI for an apparatus for warning when a child has been left in an infant seat, and a vehicle has been turned off. The apparatus disclosed in MARC A. ROSSi reference includes an occupant detection mechanism for detecting the presence of an occupant in an infant seat located within a vehicle; an ignition detection mechanism for detecting the state of the vehicle's ignition system; a control unit for generating an alarm signal when the occupant detection mechanism detects the presence of an occupant within the infant seat and the ignition detection mechanism detects that the vehicle's ignition system has been turned from an "on" state to an "off" state; and an alarm unit for generating an alarm in response to the alarm signal.

However, the above-described systems and methods tend to be overly complicated and do not provide a system that detects the non-usage of the seat belt and accordingly transmits notification signals to the remotely placed police stations. Further, the existing systems and methods are failed to alert a driver in real time that his/her child is left in the vehicle.

Therefore there is a need for an efficient, simpler and more elegant system to detect the usage of a seat belt and to initiate a notification signal on detecting non-usage of the seat belt. Further, there is a need for a system that transmits the detected data to a plurality of computing units over a communication network. Furthermore, there is a need for a system to detect that the driver is on phone call and accordingly slow down the vehicle to prevent accidents.

Other documents describing the closest subject matter provide for a number of more or less complicated features that fail to solve the problem efficiently and economically. None of these patents suggest the novel features of the present invention.

SUMMARY OF THE INVENTION

According to embodiments illustrated herein, there is provided a system for detecting usage of a seat belt and initiating a notification signal on detecting non-usage of the seat belt. Further, the system transmits the detected data to a plurality of computing units over a communication network.

The system is integrated with the seat belt of a vehicle, wherein the seat belt comprises a female unit and a male unit. The system comprises a first sensor unit, a circuitry unit, a second sensor unit, a communication unit, and a power unit. The first sensor unit and the circuitry unit are integrated with the female unit to detect an unbuckled position of the seat belt. The second sensor unit is integrated with the male unit to detect a buckled position of the seat belt on completing a circuitry when the male unit is secured into the female unit of the seat belt. The circuitry unit is electrically coupled to the first sensor unit to transmit a plurality of notification signals to a plurality of computing units over the communication network.

The notification signals are transmitted in a plurality of scenarios such as in case the male unit is removed from the female unit, the male unit is not secured into the female unit while driving, any occupant inadvertently left inside the vehicle, exceeding a legal speed of the vehicle, etc. The computing units are placed at a remote location such as a police station. In case, the second sensor unit fails to complete the circuitry then the circuitry unit transmits the notification signal to the computing unit installed at the police station. The circuitry unit establishes communication with an engine control module (ECM) of the vehicle not to allow the ignition engine to start operation on detecting that the male unit is not secured into the female unit when the occupant starts the ignition engine.

Further, the first sensor unit and the second sensor unit are in continuous communication with the occupant's computing unit and slows down the speed of the vehicle on detecting an ongoing phone call to limit the speed within a predefined range. Furthermore, the first sensing unit and the second sensing unit of all the seat belts are communicatively coupled with the occupant's computing unit and audio unit of the vehicle and transmit the notification signals in case any of the seat belts are not unbuckled when the driver is not present in the vehicle.

In an aspect, the circuitry unit is operably connected with the communication unit to transmit the notification signals such as text messages to the computing units In an aspect, the power unit energizes the first sensor unit, the second sensor unit, the circuitry unit, and the communication unit.

Accordingly, one advantage of the present invention is that it provides enhanced safety for a plurality of occupants present in the vehicle by helping to prevent accidents on the roads and it also prevents parents from leaving their children in the vehicles.

Another advantage of the present invention is that it ensures that the vehicle occupants are following the traffic rules.

Another advantage of the present invention is that it is water proof and temper resistant for child safety. Further, the present invention resists sweat, dust, food or any liquids and food crumbs, or any types of waste and spills, etc.

Further objects of the invention will be brought out in the following part of the specification, wherein detailed description is for the purpose of fully disclosing the invention without placing any limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

The present disclosure is best understood with reference to the detailed drawings and description set forth herein. Various embodiments have been discussed with reference to the drawings. However, the person skilled in the art will readily appreciate that the detailed descriptions provided herein with respect to the drawings are merely for explanatory purposes, as the systems and methods may extend beyond the described embodiments. For instance, the teachings presented and the needs of a particular application may yield multiple alternative and suitable approaches to implement the functionality of any detail described herein. Therefore, any approach may extend beyond certain implementation choices in the following embodiments.

Figure 1:
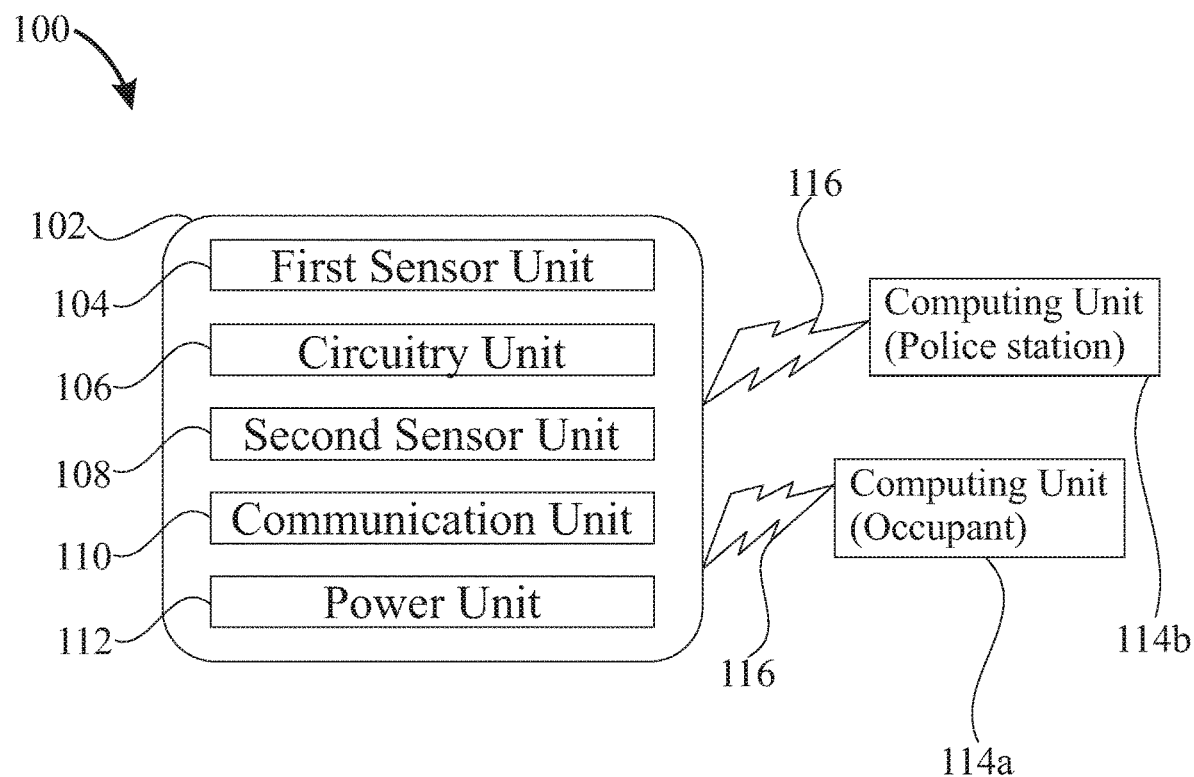
FIG. 1 represents a block diagram 100 of the present system 102 for detecting usage of a seat belt 118, in accordance with at least one embodiment.

FIG. 1 represents a block diagram 100 of the present system 102 for detecting usage of a seat belt 118, in accordance with at least one embodiment. The system 102 further initiates a notification signal on detecting non-usage of the seat belt 118. Further, the system 102 transmits the detected data to a plurality of computing units 114a and 114b over a communication network 116. The communication network 116 can be implemented as one of the different types of networks, such as an intranet, local area network (LAN), wide area network (WAN), the internet, and the like. The communication network 116 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the communication network 116 may include a variety of network devices, including routers, bridges, servers, computing devices, storage devices, and the like.

Figure 2:
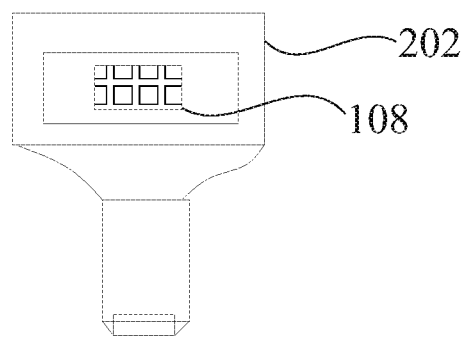
FIG. 2 represents an exploded view 200 of the male unit 202 and the female unit 204 of the seat belt 118 adaptable to integrate the present system 102 for detecting usage of the seat belt 118, in accordance with at least one embodiment.
Figure 2:
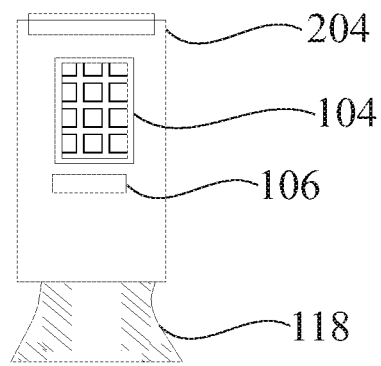

FIG. 2 represents an exploded view 200 of the male unit 202 and the female unit 204 of the seat belt 118 adaptable to integrate the present system 102 for detecting usage of the seat belt 118, in accordance with at least one embodiment.

The system 102 is integrated with the seat belt 118 of a vehicle, wherein the seat belt 118 comprises a female unit 204 and a male unit 204. The system 102 comprises a first sensor unit 104, a circuitry unit 106, a second sensor unit 108, a communication unit 110, and a power unit 112. In an embodiment, the circuitry unit 106 is an integrated circuit that is designed to achieve the objective of the present system 102. Further, the circuitry unit 106 acts as an application-specific integrated circuit (ASIC) in which a plurality of transistors and circuit elements (resistors, capacitors, inductors diodes, etc.) are fabricated on a single silicon substrate.

Figure 3:
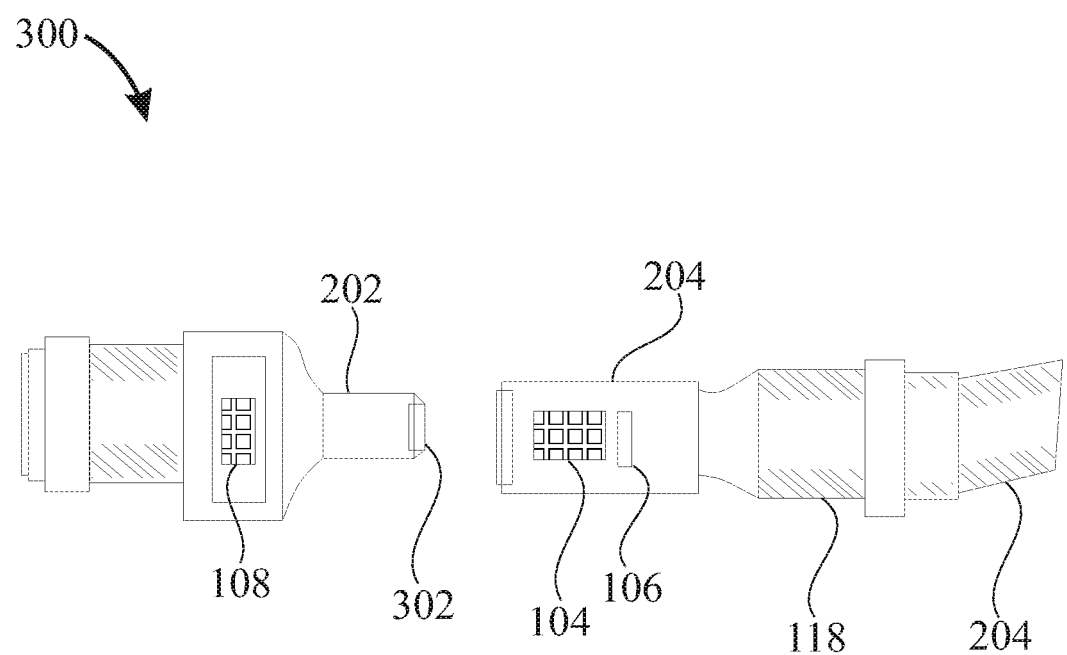
FIG. 3 represents the seat belt 118 in an unbuckled position 300, in accordance with at least one embodiment.
Figure 4:
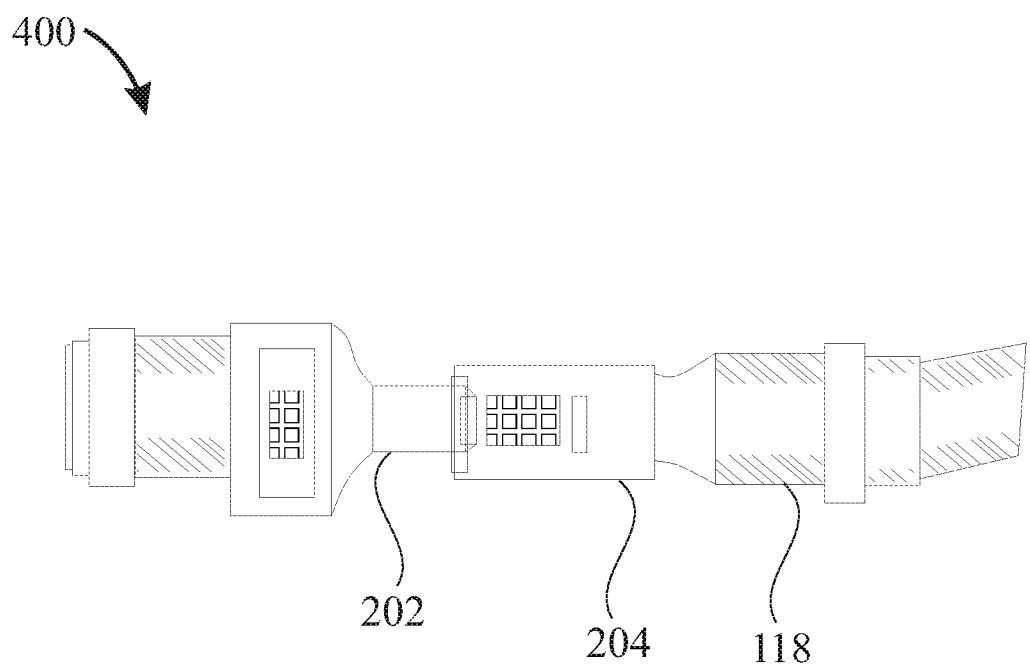
FIG. 4 represents the seat belt 118 in a buckled position 400, in accordance with at least one embodiment.

The first sensor unit 104, and the circuitry unit 106 are integrated with the female unit 204 to detect an unbuckled position 300 (shown in FIG. 3) of the seat belt. The second sensor unit 108 is integrated with the male unit 202 to detect a buckled position 400 (shown in FIG. 4) of the seat belt 118 on completing a circuitry when the male unit 202 is secured into the female 204 unit of the seat belt 118. The circuitry unit 106 is electrically coupled to the first sensor unit 104 to transmit a plurality of notification signals to a plurality of computing units 114a and 114b over the communication network 116.

Example of the first sensor unit 104 and the second sensor unit 108 includes but not limited to a magnetic field sensor such as a Giant magnetoresistance (GMR) sensor. In an embodiment, the magnetic field sensor responds to a magnet 302 (shown in FIG. 3) affixed to the male unit 202 of the seat belt. It should be understood that other types of magnetic field sensors such as Hall sensors and other solid state sensors as exist or may be developed could be used to accomplish the objective of the present system 102.

The notification signals are transmitted in a plurality of scenarios such as in case the male unit 202 is removed from the female unit 204, the male unit 202 is not secured into the female unit 204 while driving, any occupant inadvertently left inside the vehicle, exceeding a legal speed of the vehicle, etc. Examples of the notification signals include but not limited to are an audio signal, a text message, a vibration signal, a lightning signal, etc. In one embodiment, all seats have sensors that make vehicle slow down when the seat belts are unbuckled.

The computing units are placed at a remote location such as a police station. Examples of the computing units 114a and 114b may include but are not limited to, a mobile phone, a portable computer, a personal digital assistant, and a handheld device.

If the second sensor unit 108 fails to complete the circuitry, the circuitry unit 106 transmits the notification signal to the computing unit 114b installed at the police station. In an embodiment, the circuitry unit 106 is operably connected with the communication unit 110 to transmit the notification signals such as text messages to the computing units 114a and 114b. In an embodiment, the communication unit 110 is selected from at least of a Zigbee module, a Bluetooth module, a wireless module, and/or a combination thereof.

In an embodiment, the power unit 112 energizes the first sensor unit 104, the second sensor unit 108, the circuitry unit 106 and the communication unit 110. In an exemplary embodiment, the power unit 112 includes a battery such as lithium ion or batteries having small current ratings with a long discharging cycle such as an absorbent glass mat (AGM) battery, a sealed lead acid (SLA) battery, a flooded lead acid battery, or a gel cell.

The circuitry unit 106 establishes a wired or wireless communication with an engine control module (ECM) of the vehicle not to allow the ignition engine to start operation on detecting that the male unit 202 is not secured into the female unit 204 when the occupant starts the ignition engine.

In an embodiment, the first sensor unit 104 and the second sensor unit 108 compulsorily transmit the unbuckled position and buckled position data to the occupant's computing unit 114*a* via the circuitry unit when the occupant starts the ignition engine of the vehicle.

Further, the first sensor unit 104 and the second sensor unit 108 are in continuous communication with the occupant's computing unit 114*a* and slows down the speed of the vehicle on detecting an ongoing phone call to limit the speed within a predefined range.

Furthermore, the first sensing unit 104 and the second sensing unit 108 of all the seat belts are communicatively coupled with the occupant's computing unit 114*a* and audio unit (speakers) of the vehicle and transmits the notification signals in case any of the seat belts are not unbuckled when the driver is not present in the vehicle. For example, in case a parent or guardian exits the vehicle, and the keys were left inside the vehicle, and he/she accidentally attempts to lock the door of the vehicle and forgets a child in the vehicle, then the sensor units 104 and 108 installed in the seat belt 118 do not allow the doors to be locked and the notification signal such as an audio signal is initiated from the audio unit (speakers) of the vehicle, or a text message is sent to the occupant's computing unit 114*a*.

Figure 5:
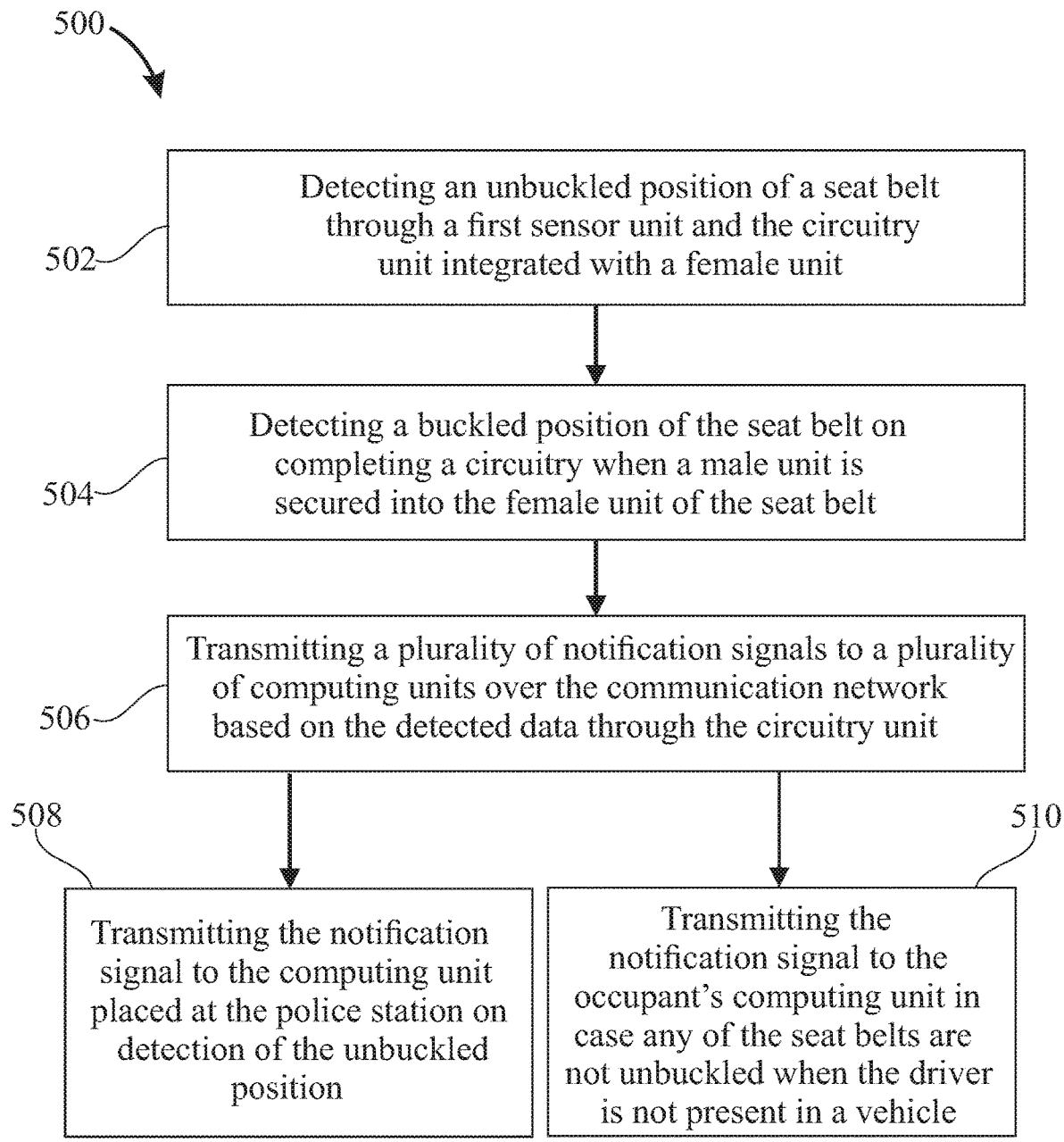
FIG. 5 represents a flowchart 500 of the method for detecting usage of a seat belt, in accordance with at least one embodiment.

FIG. 5 represents a flowchart 500 of the method for detecting usage of a seat belt, in accordance with at least one embodiment. The method initiates with a step 502 of detecting an unbuckled position of a seat belt through a first sensor unit and the circuitry unit integrated with a female unit. Then the method includes a step 504 of detecting a buckled position of the seat belt on completing a circuitry when a male unit is secured into the female unit of the seat belt. Further, the method includes the step 506 of transmitting a plurality of notification signals to a plurality of computing units over the communication network based on the detected data through the circuitry unit. The method then utilizes a first conditional step 508 of transmitting the notification signal to the computing unit placed at the police station on detection of unbuckled position. The method then utilizes a second conditional step 510 of transmitting the notification signal to the occupant's computing unit in case any of the seat belts are not unbuckled when the driver is not present in a vehicle.

While embodiments of the present invention have been illustrated and described, it will be clear that the present invention is not limited to these embodiments only. Numerous modifications, changes, variations, substitutions, and equivalents will be apparent to the person skilled in the art, without departing from the spirit and scope of the invention, as described in the claims.

What is claimed is:

1. A system for detecting usage of a seat belt and transmitting the detected usage data to a plurality of computing units over a communication network, the system comprises:
    A) a first sensor unit and a circuitry unit to detect an unbuckled position of the seat belt, wherein the seat belt comprises a female unit and a male unit, wherein the first sensor unit and the circuitry unit are integrated with the female unit;
    B) a second sensor unit integrated with the male unit to detect a buckled position of the seat belt on completing a circuitry when the male unit is secured into the female unit;
    C) a communication unit operably connected with the circuitry unit to transmit a plurality of notification signals to a computing unit installed at a police station and an occupant's computing unit over the communication network; and
    D) a power unit to energize the first sensor unit, the second sensor unit, the circuitry unit, and the communication unit.

2. The system according to claim 1, wherein the communication unit transmits the notification signal to the computing unit installed at the police station on detecting failure of completion of circuitry by the second sensor unit.

3. The system according to claim 1, wherein the circuitry unit establishes a communication with an engine control module (ECM) of the vehicle to prevent ignition engine to initiate operation on detecting that the male unit is not secured into the female unit.

4. The system according to claim 1, wherein the first sensor unit and the second sensor unit are in continuous communication with the occupant's computing unit and slows down the speed of the vehicle on detecting an ongoing phone call to limit the speed within a predefined range.

5. The system according to claim 1, wherein the first sensing unit and the second sensing unit of a plurality of seat belts are communicatively coupled with the occupant's computing unit and an audio unit of the vehicle to transmit the notification signals on detecting the unbuckled position when a driver is not present in the vehicle via the communication unit.

6. The system according to claim 1, wherein the notification signals are transmitted in a predefined format selected from at least one of a text message, an audio signal and/or a combination thereof.

7. The system according to claim 1, wherein the notification signals are transmitted in a plurality of scenarios selected from at least one of: removal of the male unit from the female unit, the male unit is not secured into the female unit while driving, presence of an occupant inside the vehicle, and exceeding a legal speed of the vehicle.

8. A method for detecting usage of a seat belt and transmitting the detected usage data to a plurality of computing units over a communication network, the method comprising steps of:
    A) detecting an unbuckled position of the seat belt through a first sensor unit and a circuitry unit, wherein the seat belt comprises a female unit and a male unit, wherein the first sensor unit and the circuitry unit are integrated with the female unit;
    B) detecting a buckled position of the seat belt on completing a circuitry when the male unit is secured into the female unit through a second sensor unit; and
    C) transmitting a plurality of notification signals to a computing unit installed at a police station and an occupant's computing unit over the communication network through a communication unit.

9. The method according to claim 8, wherein the step of transmitting a plurality of notification signals further comprises a step of transmitting the notification signal to the computing unit installed at the police station on detecting failure of completion of circuitry by the second sensor unit.

10. The method according to claim 8, wherein the step of transmitting a plurality of notification signals further comprises a step of transmitting the notification signals on detecting the unbuckled position when a driver is not present in the vehicle.

11. The method according to claim 8, wherein the notification signals are transmitted in a predefined format selected from at least one of a text message, an audio signal and/or a combination thereof.

12. The method according to claim 8, wherein the circuitry unit establishes a communication with an engine control module (ECM) of the vehicle to prevent ignition engine to initiate operation on detecting that the male unit is not secured into the female unit.

13. The method according to claim 8, wherein the first sensor unit and the second sensor unit are in continuous communication with the occupant's computing unit and slows down the speed of the vehicle on detecting an ongoing phone call to limit the speed within a predefined range.

14. The method according to claim 8, the first sensor unit, the second sensor unit, the circuitry unit, and the communication unit are energized through power unit.

* * * * *